Dec. 3, 1963     L. PÉRAS     3,112,739
VALVE TAPPETS OF INTERNAL COMBUSTION ENGINES
Filed Sept. 19, 1960     5 Sheets-Sheet 1
*Fig. 1*
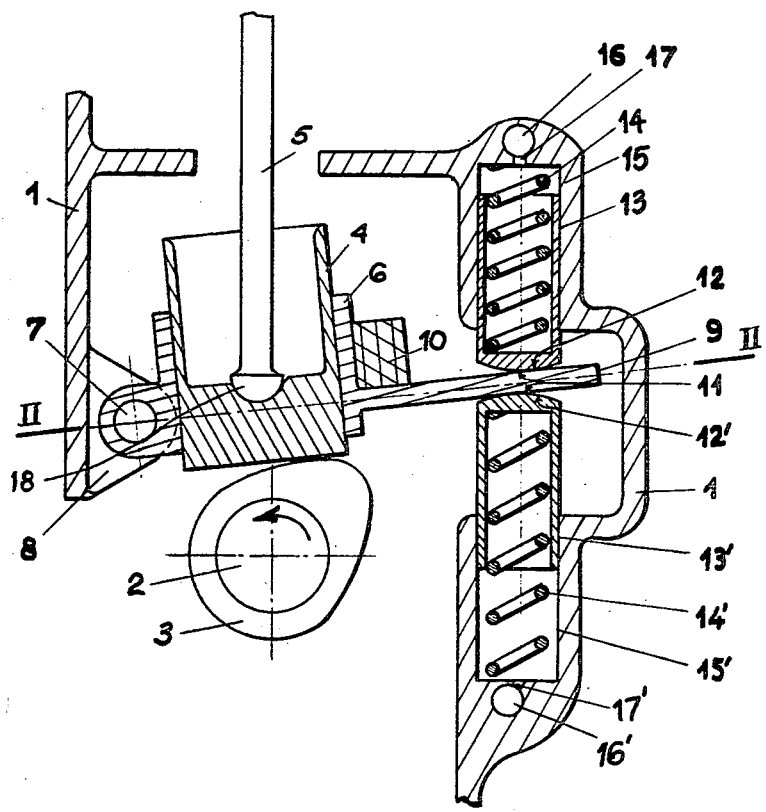
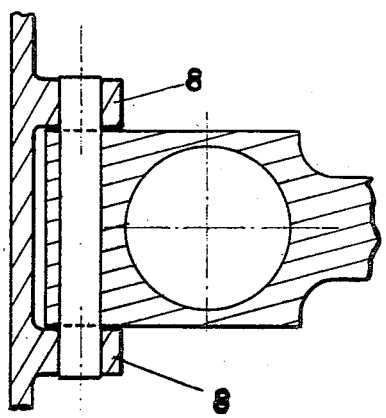
*Fig. 2*

Dec. 3, 1963         L. PÉRAS            3,112,739
         VALVE TAPPETS OF INTERNAL COMBUSTION ENGINES
Filed Sept. 19, 1960                     5 Sheets-Sheet 4

United States Patent Office 3,112,739
Patented Dec. 3, 1963

3,112,739
VALVE TAPPETS OF INTERNAL COMBUSTION ENGINES
Lucien Péras, Billancourt, France, assignor to Regie Nationale des Usines Renault, Billancourt, France
Filed Sept. 19, 1960, Ser. No. 56,923
Claims priority, application France Sept. 26, 1959
4 Claims. (Cl. 123—90)

In all volumetric apparatus utilizing a compressible fluid for their operation and comprising a positively driven distribution system, the inertia of the fluid is taken in account when determining the characteristics of this distribution system. When the rate of operation of the apparatus is selected once for all and kept to a constant value, there is no difficulty in determining mathematically and experimentally the optimum timing characteristics.

When the rate of operation is extremely variable, as in the case notably of four-stroke engines of vehicles, whether of the spark-ignition or compression-ignition type, it is not possible to establish characteristics giving the maximum efficiency at all speeds since the inertia of the fluid used is particularly variable. A compromise must be adhered to which causes the results to be partially sacrificed in the region of the (upper or lower) limits of operation.

Notably, it should be desirable that at very low speed the inlet opening and exhaust closing take place in close vicinity of the top dead center, and that the inlet closing and exhaust opening take place in close vicinity of the bottom dead center, whilst at high speed the valves open with a substantial lead and close with a substantial lag. The various compromises chosen by the manufacturers favour one or the other limit without proving fully satisfactory from the dual point of view of permissible average pressures and indicated efficiencies, or, in other words, fuel consumption.

Various propositions have already been made and tested with a view to retard the valve closing as the speed increases, but they do not solve the problem of valve-opening lead and may even create a particularly detrimental valve-opening lag.

It is the primary object of the present invention to provide a mechanical means for either increasing the lead and lag of a valve (the term "lead" denoting the quantity by which a valve opens before the piston has reached top or bottom dead center, and the term "lag" the quantity by which the valve closes after the piston has reached bottom dead center) as the speed increases from a given cam normally designed for low-speed operation, or inversely decreasing the lead and lag of a valve as the speed decreases from a given cam normally designed for maximum speed operation.

This invention consists in superposing to the normal movement of translation of the cam-responsive tappet a movement of rotation which, by causing an angular displacement of the tappet base tangent to the cam contour, will introduce a lead or lag in the beginning or in the end of the cam-controlled movement of translation.

This additional movement of rotation may be obtained by providing adequate complementary mechanical means.

By way of example, and without limiting the practical actuation of this invention to this specific arrangement, a typical form of embodiment of a device ensuring a half-free rotation of the valve tappet will now be described, this device utilizing a cam designed for high-speed operation. In this arrangement, the valve lead is reduced and the valve lag increased (or, in other words, the valve opening is retarded and the valve closing is advanced) as the speed decreases. This arrangement is illustrated diagrammatically in the accompanying drawings, wherein:

FIGURE 1 is a cross-section of one portion of an engine, which illustrates a valve tappet arrangement according to this invention;

FIGURE 2 is a fragmentary section taken upon the line II—II of FIG. 1;

Figures 3, 4, 5:
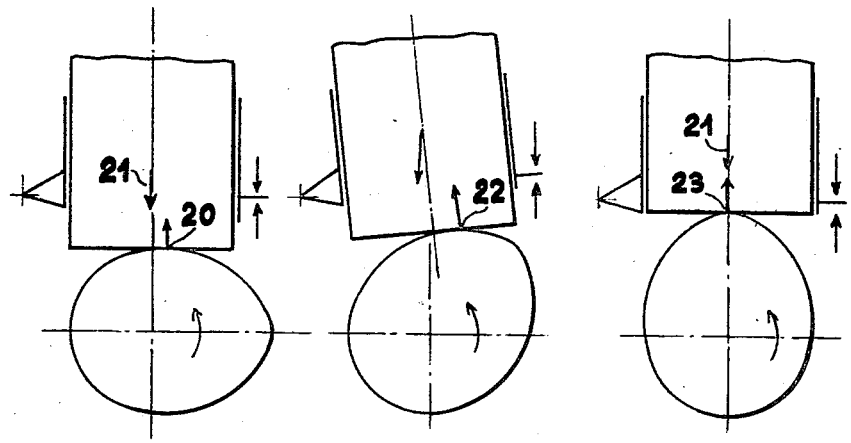
FIGURES 3, 4, 5, 6 and 7 are diagrammatic views showing the cam and tappet assembly during the different phases of its operation.

Referring first to FIG. 1, the reference numeral 1 designates the engine cylinder block casting in which the camshaft 2 is journaled. This camshaft carries a cam 3, which may be an inlet or an exhaust cam; this cam controls the valve (not shown) through the usual members, that is a tappet 4 and a push-rod 5 actuating the valve rocker (not shown).

This tappet 4, instead of being guided directly in a bore formed in the cylinder block casting, may slide (and even revolve) freely in a movable assembly 6. This assembly 6 has an axis of rotation in the form of a pivot pin 7 parallel with the axis of camshaft 2 and this pin 7 is mounted in a pair of lugs 8 projecting from the casting 1. On the side opposite to the pivot pin 7 the movable assembly 6 has a lateral flat projection 9 constituting a lever with or without a complementary metal mass 10. The outer end of lever 9 is machined to have two plane and polished bearing faces 11 normally engaged by part-spherical ends 12, 12' of a pair of opposed pistons 13, 13', respectively. These pistons are hollow and urged by compression springs 14, 14' for engagement with the lever 9, and furthermore they are slidably fitted in blind cylinders 15, 15'.

The blind end of each cylinder 15, 15' communicates through orifices 17, 17' of well-defined dimensions with ducts 16, 16' fed with oil under pressure from the normal lubrication system of the engine. The push-rod 5 engages tappet 4 through a part-spherical bearing boss 18.

Figure 8:
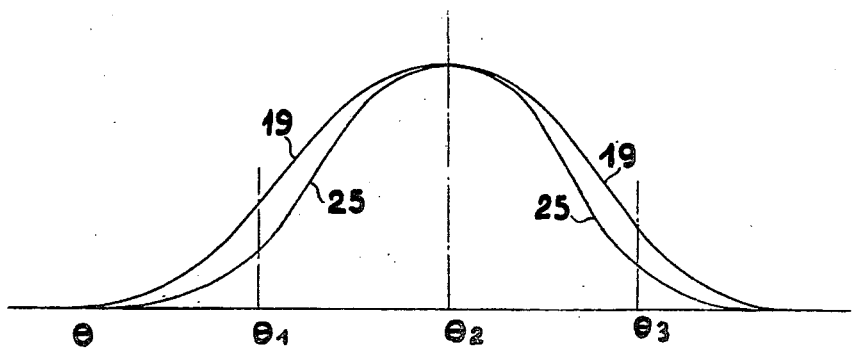
FIGURE 8 is a diagram showing the law governing the valve lift as a function of the cam angle in the case of two extreme engine speeds.

This arrangement operates as follows:

The contour of cam 3 is designed with a view to give the correct opening of the valve at the highest possible engine speed. In FIGURE 8, this law is illustrated by the curve 19. When the engine revolves slowly, this law is modified by the following incidences (see FIGS. 3 to 7):

Immediately as the clearance of the valve operating mechanism has been absorbed and the cam begins to actuate the tappet, the movable assembly 6 begins to revolve about its axis in the direction of the cam rotation. Thus, the point of contact will gradually move to the right and at the same time the tappet begins to slide slightly in the assembly and to lift the valve.

FIGURE 4 shows for example the position attained at 22 by the contact point which corresponds substantially to the angle $\theta_1$ of FIG. 8.

Meanwhile, the spring 14 has been compressed and spring 14' allowed to expand, so that the resistance torque counteracting the rotation has increased. Due to the low speed, the oil contained in cylinders 15 has been allowed to escape through the orifice 17 without producing an appreciable resistance. The tappet tends to resume substantially its initial upright position when the point of contact has moved back to 23 centrally of the tappet (FIG. 5). This corresponds to position $\theta_2$ of FIG. 8.

Figures 6, 7:
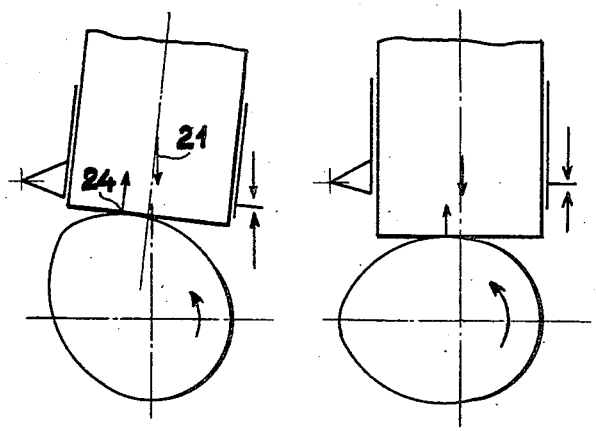

As the cam rotation continues, the point of contact moves now to the left, for example, to position 24 (FIG. 6). The rotation torque applied to the movable assembly tends to oscillate the movable assembly 6 in the direction opposite to the cam rotation inasmuch as the reaction torque produced by the springs 14, 14' is very moderate.

The valve-closing phases take place in a manner substantially symmetrical with respect to the valve-opening phases, FIG. 6, corresponding substantially to the angle $\theta_3$ of FIG. 8. FIGURE 7 shows more particularly the position obtaining when the cam is about to leave the tappet. During the subsequent rotation of the camshaft which corresponds to the compression and expansion strokes the movable assembly 6 is not actuated and remains in its mean position of equilibrium.

Under these conditions, the valve-lifting law may be represented by a curve 25 (FIG. 8) and it will be seen that this law is considerably more consistent with the shape corresponding to a correct operation at low speed.

In the case of high-speed operation, the complementary movement of rotation of the tappet which has just been described cannot take place for, in spite of an increase in the reaction 21 which is due to the inertia of the complete valve gear, the reaction torque becomes immediately very considerable due to:

(1) The inertia of tappet 5 and movable assembly 6;
(2) The damping effort resulting from the difficult flow of lubricating oil from the cylinders 15, 15' through the orifices 17, 17'.

Since the additional movement of rotation defined hereinabove cannot take place at high speed, the movement of translation of the tappet takes place as usual and the law governing the valve lift is that shown at 19 in FIG. 8.

For all intermediate speeds there exist intermediate conditions of rotation of the movable assembly 6, so that a complete range of intermediate valve lift laws between law 25 and law 19 are obtained automatically.

By properly selecting the elements governing the conditions of equilibrium of the movable assembly, such as springs, fluid damping action, inertia, etc., it is possible to adapt for a same engine these different curves to the optimum operation of the engine at each speed.

Corresponding results may be obtained by substituting the effect of two leaf springs for the effect of inertia, these springs being rigid with the movable assembly and responsive to the action of an eccentric carried by the camshaft (see FIGS. 9–19).

Figure 9:
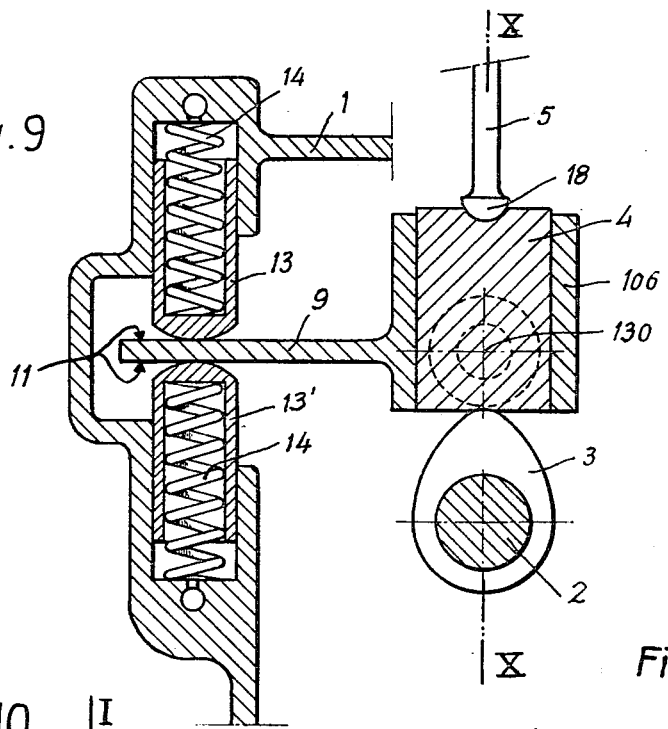
FIGURE 9 is a vertical section showing a typical assembly constructed according to the teachings of this invention, the section being taken upon the line I—I of FIG. 10.

Referring to FIG. 9, the assembly comprises again the engine block casting 1, the camshaft 2 carrying the cam 3 controlling the valve (not shown) through the intermediary of a tappet 4 and a push-rod 5 actuating the rocker (not shown); the tappet 4 is slidably mounted in a bore formed in a movable assembly or socket 106 formed with a lateral extension forming a lever 9 of which the outer end comprises a pair of opposite plane and polished faces 11 engaged by the part-spherical ends of corresponding opposed pistons 13, 13' sliding respectively in cylinders in which they are subjected to the action of springs 14, 14'.

However, in this alternate embodiment the centre of oscillation of the movable assembly 9 is transferred to the common axis of the camshaft 2 and push-rod 3. Actually, the movable assembly can oscillate freely about the axis 130 (FIG. 10) and is provided to this end with a pair of trunnions 120, 120' journaled in bearings 121, 121'.

Concentric bosses 119, 119' are formed on the lateral walls of socket 106, one of them 119' being somewhat thicker than the other 119.

Figure 10:
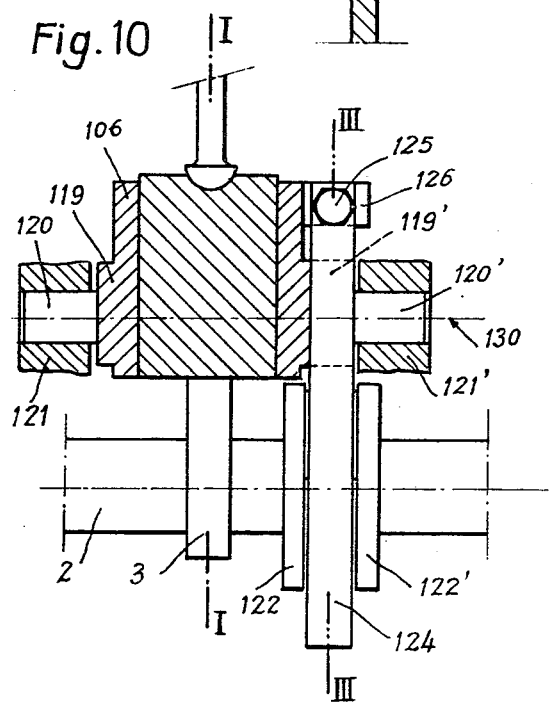
FIGURE 10 is another vertical section taken upon the line X—X of FIG. 9.
Figure 11:
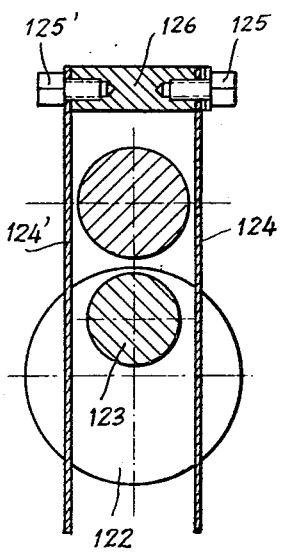
FIGURE 11 is another vertical section taken upon the line III—III of FIG. 10.
Figure 12:
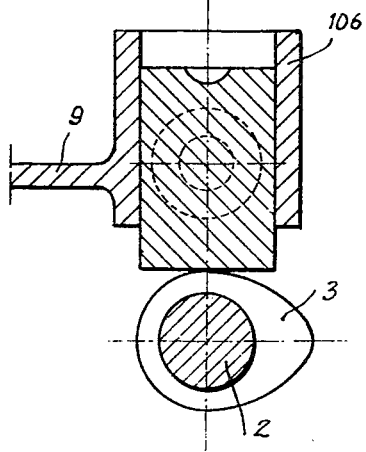
FIGURES 12 to 19 illustrate all the positions which the movable assembly and the cam-shaft may assume in two cam positions spaced 180° apart, FIGS. 12 to 15 illustrating the case of high speeds and FIGS. 16 to 19 the case of low speeds.
Figure 13:
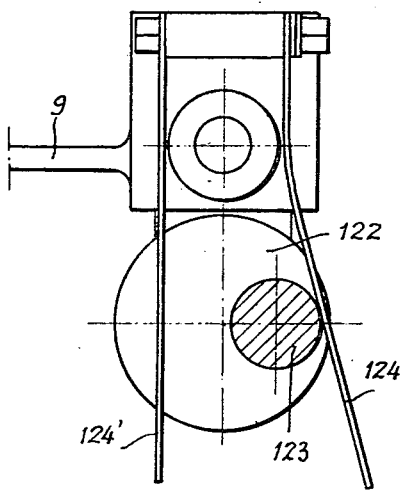
Figure 14:
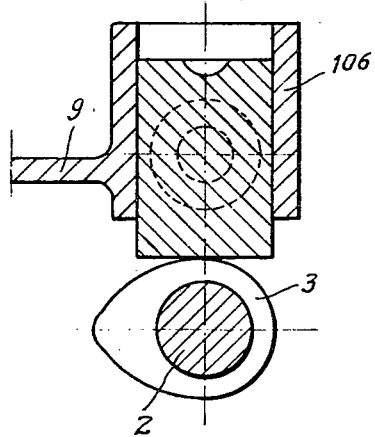
Figure 15:
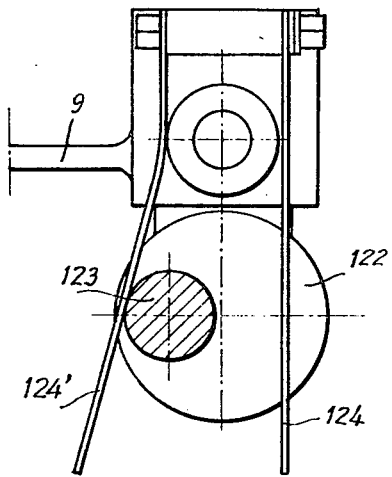
Figure 16:
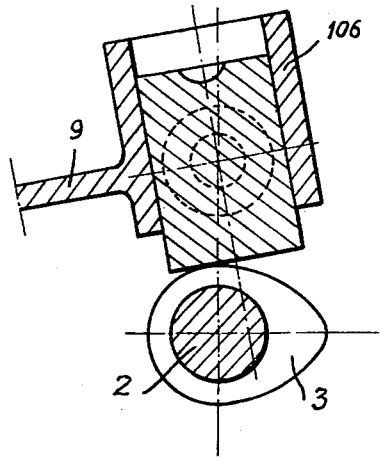
Figure 17:
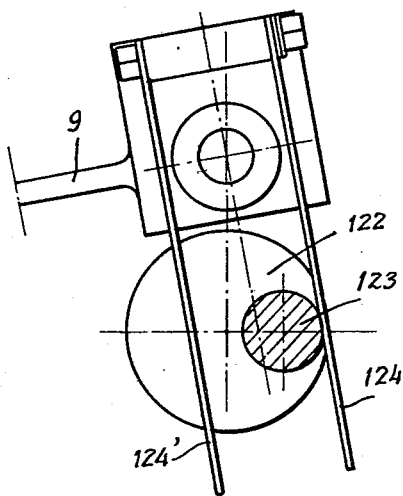
Figure 18:
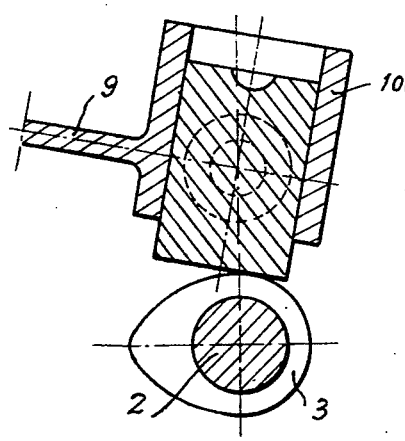
Figure 19:
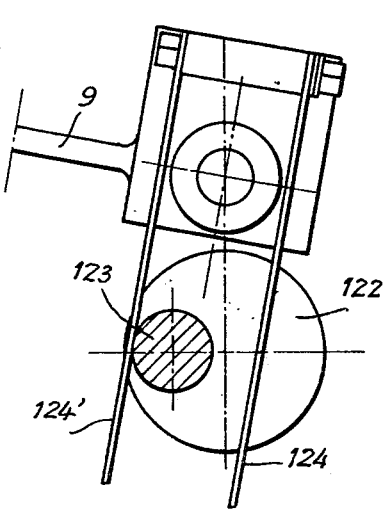

As shown in FIGS. 10 and 11, spring blades 124, 124' are secured by means of screws 125, 125' respectively on a lug 126 projecting from the upper portion of socket 106.

On the other hand, an eccentric crankpin 123 of a diameter smaller than the relative normal spacing of blades 124, 124' is adapted to push these blades laterally according to the angular position of the camshaft.

The two blades 124, 124' themselves are guided and/or prevented from moving in the axial direction of the camshaft by flanges or shoulders 122, 122' formed on this camshaft.

This alternate arrangement operates as follows: At very high speed (see FIGS. 12 to 15) due to the inertia of the device the crankpin 123 moves either the blade 124 or the blade 124' away from its normal position, according to the crankpin position, the movable assembly 106 with its lever 9 remaining horizontal so that the valve may be actuated as contemplated for high speeds with valve-opening lead and valve-closing lag.

On the other hand as illustrated in FIGS. 16 to 19, at low speed the relative rigidity of springs 124, 124' cause the movable assembly 106 to take an inclined position under the influence of crankpin 123, so as to modify the valve timing in the proper direction to restore the valve closing and opening in the vicinity of the top and bottom dead centre of the engine.

Although the present invention has been described in conjunction with preferred embodiments, it is to be understood that these embodiments are shown only in diagrammatic form herein and that modifications and variations may be resorted to without departing from the spirit and scope of the invention as those skilled in the art will readily understand. Such modifications and variations are considered to be within the purview and scope of the invention and appended claims.

I claim:

1. Control device for inlet and outlet valves of an internal combustion engine comprising a rotatable cam shaft having a cam thereon, a valve tappet engaged by said cam, a movable assembly mounted to oscillate about a stationary axis parallel to the rotational axis of said cam and in which said tappet is mounted in axially sliding fashion, said movable assembly being adapted to oscillate during the actuation of the valve, so that there will result automatically a retarding of the valve opening and an advance of the valve closing when the engine speed decreases, the movable oscillating assembly being controlled by a pair of opposed springs.

2. Control device according to claim 1, characterized in that said springs acting upon said movable assembly are associated with a pair of pistons responsive to the damping action of a fluid.

3. Control device for inlet and outlet valves of an internal combustion engine comprising a rotatable cam shaft having a cam thereon, a valve tappet engaged by said cam, a movable assembly mounted to oscillate about a stationary axis parallel to the rotational axis of said cam and in which said tappet is mounted in axially sliding fashion, said movable assembly being adapted to oscillate during the actuation of the valve, so that there will result automatically a retarding of the valve opening and an advance of the valve closing when the engine speed decreases, said oscillating movable assembly being provided with a pair of parallel spring blades responsive to the control action of an eccentric carried by the camshaft.

4. Control device according to claim 3, characterized in that the axis of oscillation of the movable oscillating assembly is located substantially in alignment with the rotational axis of the cam and the axis of the tappet.

References Cited in the file of this patent
UNITED STATES PATENTS

| | | |
|---|---|---|
| 1,294,077 | Fenchelle | Feb. 11, 1919 |
| 1,701,599 | Woolson | Feb. 12, 1929 |
| 2,041,983 | Van Ranst | May 26, 1936 |
| 2,484,926 | Bennett et al. | Oct. 18, 1949 |
| 3,040,723 | Scherenberg et al. | June 26, 1962 |